(12) United States Patent
Wang et al.

(10) Patent No.: US 9,796,075 B2
(45) Date of Patent: Oct. 24, 2017

(54) FIXTURING DEVICE AND METHOD OF USE

(71) Applicant: Apex Brands, Inc., Apex, NC (US)

(72) Inventors: Yen-Chien Wang, Kirkland, WA (US); Lincoln Coleman Wilkes, Kenmore, WA (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 15/118,450

(22) PCT Filed: Feb. 12, 2015

(86) PCT No.: PCT/US2015/015559
§ 371 (c)(1),
(2) Date: Aug. 11, 2016

(87) PCT Pub. No.: WO2015/123387
PCT Pub. Date: Aug. 20, 2015

(65) Prior Publication Data
US 2017/0173777 A1    Jun. 22, 2017

Related U.S. Application Data

(60) Provisional application No. 61/940,098, filed on Feb. 14, 2014.

(51) Int. Cl.
*B25H 1/00* (2006.01)
*B23B 31/40* (2006.01)
(Continued)

(52) U.S. Cl.
CPC ....... *B25H 1/0064* (2013.01); *B23B 31/4006* (2013.01); *B23B 31/42* (2013.01);
(Continued)

(58) Field of Classification Search
CPC .............. B25H 1/0064; B25H 2231/00; B25H 2231/04; B25H 29/00; B23B 31/4006;
(Continued)

(56) References Cited

U.S. PATENT DOCUMENTS 2,213,379 A     9/1940  Bird et al.
2,435,480 A  *  2/1948  Tuttle ................. B23B 31/4033
                                                              279/145
(Continued)

FOREIGN PATENT DOCUMENTS

| CN | 101537806 A | 9/2009 |
| CN | 102815396 A | 12/2012 |
| EP | 1410880 A1 | 4/2004 |

OTHER PUBLICATIONS

International search report, International application No. PCT/US2015/015559. daed May 13, 2015. ISA/US, Alexandria, VA.

*Primary Examiner* — Will Fridie, Jr.
(74) *Attorney, Agent, or Firm* — Coates & Bennett, PLLC

(57) ABSTRACT

A fixturing device for attaching attached to a work piece and methods of attaching the fixturing device to the work piece. The device may include a body, a base, and an extension. The extension may extend outward from the body and is sized to initially be positioned within an opening in the work piece. The extension may be expandable in size to engage with a backside of the work piece at the opening to secure the device to the work piece. The device further includes an interface for receiving to a tool that performs an operation on the work piece.

20 Claims, 9 Drawing Sheets

(51) Int. Cl.
  *B23B 31/42* (2006.01)
  *B23Q 9/02* (2006.01)
(52) U.S. Cl.
  CPC ............ *B23Q 9/02* (2013.01); *B23B 2260/07* (2013.01); *B23B 2260/128* (2013.01)
(58) Field of Classification Search
  CPC . B23B 31/42; B23C 2260/28; B23C 2260/76; B23C 7/02; B23C 7/04
  See application file for complete search history.

(56) References Cited

U.S. PATENT DOCUMENTS

| | | | |
|---|---|---|---|
| 2,789,825 A | 4/1957 | Drew | |
| 2,911,860 A * | 11/1959 | Winslow | B25H 1/0064 408/111 |
| 3,663,115 A * | 5/1972 | Vindez | B25H 1/0064 269/157 |
| 4,396,318 A * | 8/1983 | Jensen | B25H 1/0064 173/32 |
| 4,594,035 A * | 6/1986 | Hoyss | B25H 1/0064 29/26 R |
| 5,062,746 A * | 11/1991 | Deremo | B23B 47/28 408/79 |
| 5,395,187 A | 3/1995 | Slesinski et al. | |
| 7,273,333 B2 * | 9/2007 | Buttrick, Jr. | B23Q 9/0042 408/1 R |
| 8,794,088 B2 | 8/2014 | Quenerch'Du et al. | |
| 2004/0013484 A1 * | 1/2004 | Ohlendorf | B25H 1/0064 408/234 |
| 2009/0236891 A1 | 9/2009 | Ito | |
| 2010/0242642 A1 | 9/2010 | Ganter | |
| 2011/0036206 A1 | 2/2011 | Yang | |
| 2013/0108386 A1 | 5/2013 | Ihara et al. | |

* cited by examiner

FIXTURING DEVICE AND METHOD OF USE

RELATED APPLICATIONS

The present application claims priority to U.S. Application No. 61/940,098 filed on Feb. 14, 2014 entitled Fixturing Device and Methods of Use. This application is hereby incorporated by reference in its entirety.

BACKGROUND

A fixturing device is used for holding and supporting a tool in a manufacturing environment to allow the tool to be used on a work piece. The device securely positions the tool in a specific location or orientation relative to the work piece. Once secured, the tool is activated to perform an operation on the work piece. Once the operation is complete, the device can be removed from the work piece and then repositioned at a new location to perform a similar operation. One example of use is a fixturing device that supports drilling equipment for performing various operations on a work piece, including drilling, countersinking, reaming, and various combinations.

Existing devices are often based on pneumatic or other type of fluid cylinders. One issue associated with fluid cylinders is their output force to size ratio. In order to generate enough force to adequately secure the device onto the work piece, the device would have to be made so big that it would interfere with the ergonomics of the tool (e.g. adding size and weight).

Another issue with existing fixturing devices is their difficulty in adequately securing to a work piece. The devices often include complicated mechanisms that are difficult to operate. This may include difficulty in accurately positioning the device relative to the work piece and/or difficulty in activating the device to secure the position. Because of the complexities, the fixturing device may require extensive user training prior to use in the manufacturing environment. This may include initial training when introducing an operator to the device, as well as periodic refreshers to make certain the device is being used correctly for the particular operation.

Even when the operator is properly trained on how to use the device, the complexities may result in the operator taking a longer time to perform the various operations. This extended time results in a reduction in productivity. In an attempt to speed up production, operators may not securely position the device on the work piece. This may cause the device to move during operation of the tool resulting in a defect in the work piece and/or damage to the tool.

The complicated fixturing devices may also result in excessive repairs and maintenance to keep the devices in operation. This may include replacing worn or broken components, as well as periodic maintenance to ensure the device is working properly.

SUMMARY

The present application is directed to a fixturing device for attaching to a work piece for positioning a tool to perform an operation on the work piece. One embodiment is directed to a fixturing device to position a tool relative to a work piece. The fixturing device includes a motor, and a gear set with at least first and second gears that are driven by the motor with the first gear being positioned in closer proximity to the motor than the second gear. The device also includes a screw that is connected to second gear to move in a first axial direction away from the work piece when the gear set is driven in a first rotational direction by the motor and to move in an opposing second axial direction towards the work piece when the gear set is driven in a second rotational direction by the motor. A protrusion is positioned within a slot in the screw to prevent the screw from rotating when moving in the first and second axial directions. A mandrel is attached to the screw to move in the first and second axial directions with the screw with the mandrel including an enlarged head. The device includes an expandable collet with a hollow interior that receives the mandrel and an enlarged flange. The mandrel is axially movable within the hollow interior and includes a first width at the flange when the enlarged head is positioned outward beyond a distal end of the collet and a larger second width at the flange when the enlarged head is position within the hollow interior. The device also includes at least one position sensor to determine an axial position of the screw. An enlarged base is a contact surface is spaced away from the enlarged flange. The base is positioned to contact against the work piece when the collet is in the larger second width.

The device may include the screw extending within an opening in the second gear with both the opening and the second gear each including threads that engage together to move the screw in the first and second axial directions during rotation of the second gear respectively in the first and second rotational directions.

The screw and the second gear may be threaded to prevent movement of the screw and the mandrel during a disruption in an air supply.

The mandrel may be attached to an end of the screw and the mandrel and the screw together may include an elongated, straight shape.

The device may also include an enlarged marker attached to the screw. The marker may include a larger width than the screw with the at least one position sensor configured to detect a location of the marker.

The mandrel may include a greater length than the collet.

The device may also include the base with an opening that receives the mandrel and the collet with the enlarged head of the mandrel and the distal end of the collet each positioned on an opposing side of the base from the motor.

Another embodiment is directed to a fixturing device to position a tool relative to a work piece. The device includes a body. An elongated member is connected to and driven by the motor and the elongated member is movable relative to the body in upward and downward directions along an axis between a first upward position and a second downward position. The elongated member includes a first end and an opposing second end, and an enlarged head positioned in proximity to the first end. The elongated member also includes an identifying marker positioned between the first and second ends. The device includes an upper position sensor configured to detect the identifying marker when the elongated member has moved along the axis to a predetermined upward position, and a downward position sensor configured to detect the identifying marker when the elongated member has moved along the axis to a predetermined downward position. A base includes an opening through which the elongated member extends. The base includes an enlarged contact surface that is transverse to the elongated member. The device includes a collet that is movably positioned within the opening and includes a hollow interior space that receives the elongated member with the collet being expandable to include a first width at a flange when the elongated member is at the predetermined downward position with the head positioned outward beyond the distal end of the collet and a larger second width at the flange when the elongated member is at the predetermined upward position with the head positioned within the hollow interior space of the collet and the flange is at a smaller second distance from the contact surface of the base.

The elongated member may include a threaded screw and a mandrel attached to an end of the threaded screw.

The collet may include one or more slits that extend inward from the distal end with each of the slits including opposing sides that are positioned a greater distance apart when the head of the elongated member is positioned within the interior space of the collet than when the head is positions outward beyond the distal end.

The identifying marker may include a nut that is attached onto the elongated member and positioned between the first and second ends.

The fixturing device may also include a gear set that is driven by the motor in first rotational directions and in opposing second rotational directions, the gear set being connected to the elongated member to drive the elongated member. The gear set may include a feed gear that is threaded on the elongated member with the elongated member extending through an opening in the feed gear.

Another embodiment is directed to a method of attaching a fixturing device to a work piece. The method includes positioning a base on a first side of the work piece and inserting a collet that extends outward from the base through an opening in the work piece with a distal end of the collet being outward beyond a second side of the work piece. The method includes operating a motor and linearly moving an elongated member that is connected to the motor in a first direction with the elongated member extending within the collet. The method includes moving an enlarged head of the elongated member into an interior of the collet and expanding a size of the collet such that a flange on the exterior of the collet is larger than the opening in the work piece. The method includes moving the collet with the elongated member in the first direction and contacting the flange against the second side of the work piece and clamping the work piece against the base. The method includes afterwards operating the motor and linearly moving the elongated member in an opposing second direction. The method includes moving the enlarged head of the elongated member out of the interior of the collet and reducing the size of the collet. The method includes moving the collet through the opening in the work piece and removing the device from the work piece while the collet is in the reduced size.

The method may include that positioning the base on the first side of the work piece includes contacting the base against the first side of the work piece.

The method may include operating the motor in a first direction and rotating a feed gear that is operatively connected to the elongated member and moving the elongated member in the first direction and operating the motor in a second direction and rotating the feed gear and moving the elongated member in the second direction.

The method may include linearly moving the elongated member in the first and second directions without rotating the elongated member.

The method may include stopping the movement of the elongated member in the first direction upon sensing that the elongated member has moved to a first predetermined position.

The method may include moving the elongated member through an opening in the feed gear.

The method may include receiving a signal from a position sensor when the elongated member moves to a first predetermined position and stopping the movement of the elongated member in the first direction.

The method may include monitoring a position of the elongated member within a body of the device with one or more position sensors.

The various aspects of the various embodiments may be used alone or in any combination, as is desired.

DETAILED DESCRIPTION

The present application is directed to a fixturing device for clamping to a work piece. The fixturing device provides a base for attachment of a tool. The device accurately locates the tool relative to the work piece thus enabling the tool to perform an operation at the precise location. The fixturing device is configured to convert rotational movement from a motor to linear movement of an elongated member to fix the position of the device.

Figure 1:
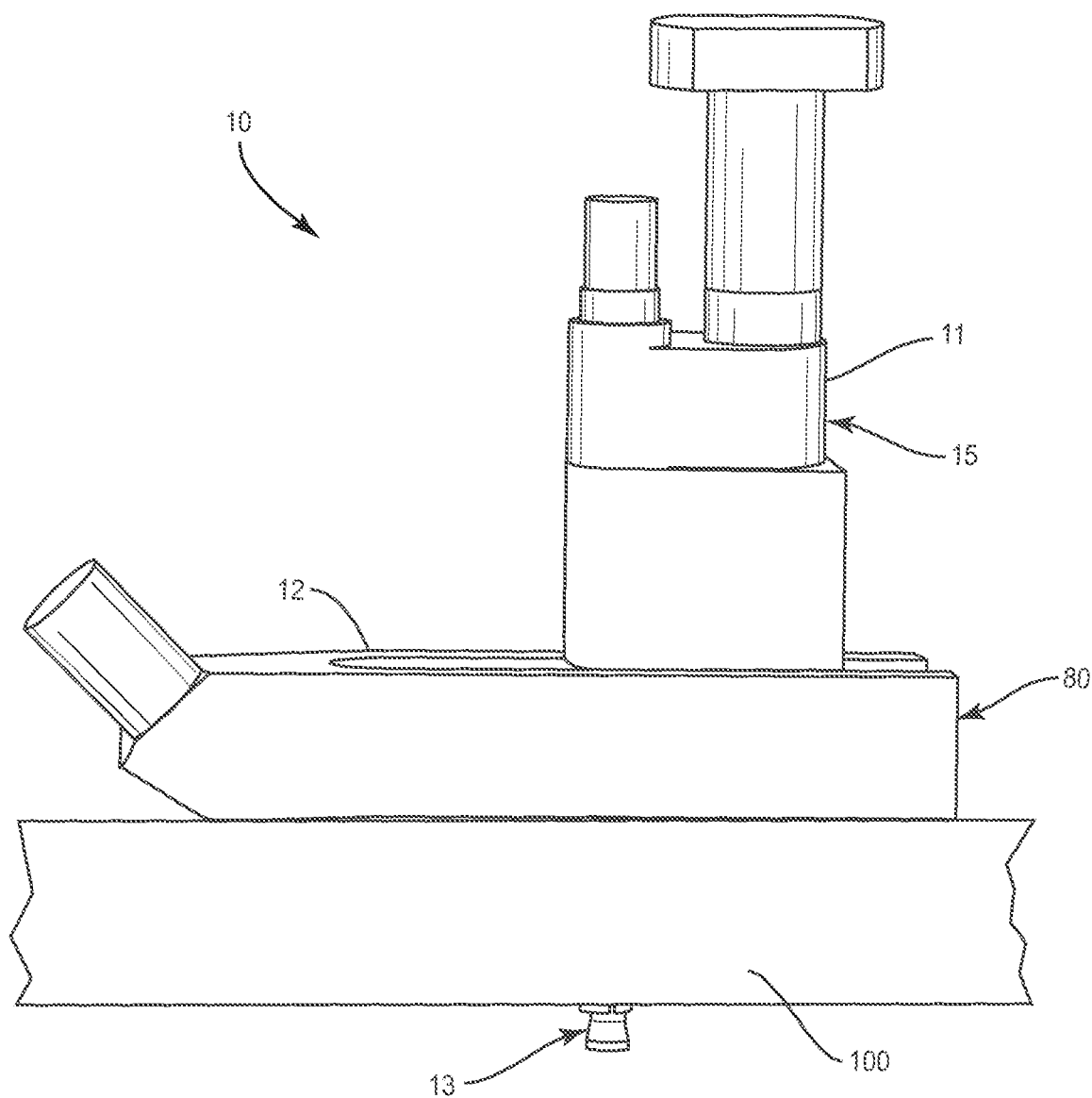
FIG. 1 is a side view of a fixturing device positioned on a work piece.

FIG. 1 illustrates a fixturing device 10 attached to a work piece 100. Generally, the device 10 includes a body 15, base 80, and an extension 13. An exterior housing 11 extends around the body 15 to protect the internal components. The extension 13 extends outward and is sized to initially be positioned within an opening 120 in the work piece 100. The extension 13 can be expanded in size to engage with a backside of the work piece 100 at the opening 120 to secure the device 10 to the work piece 100. The device 10 further includes an interface 12 for receiving to a tool (see FIG. 7). The embodiment of FIG. 1 is designed for attachment with a drill, although the device 10 may be used with other tools.

In use, the device 10 is positioned with the extension 13 while in a reduced size being inserted within an opening 110 in the work piece 100. Once positioned, the extension 13 is expanded in size. Further, the extension 13 applies a clamping force to the back side of the work piece 100 to clamp the work piece 100 against the base 80 to secure the device 10 to the work piece 100. The tool may then be activated to perform an operation on the work piece 100 at the desired location. Once the operation is complete, the extension 13 is reduced in size and removed from the work piece 100. The device 10 may then be repositioned at a different location on the work piece 100 to position the tool to complete another operation.

Figure 2:
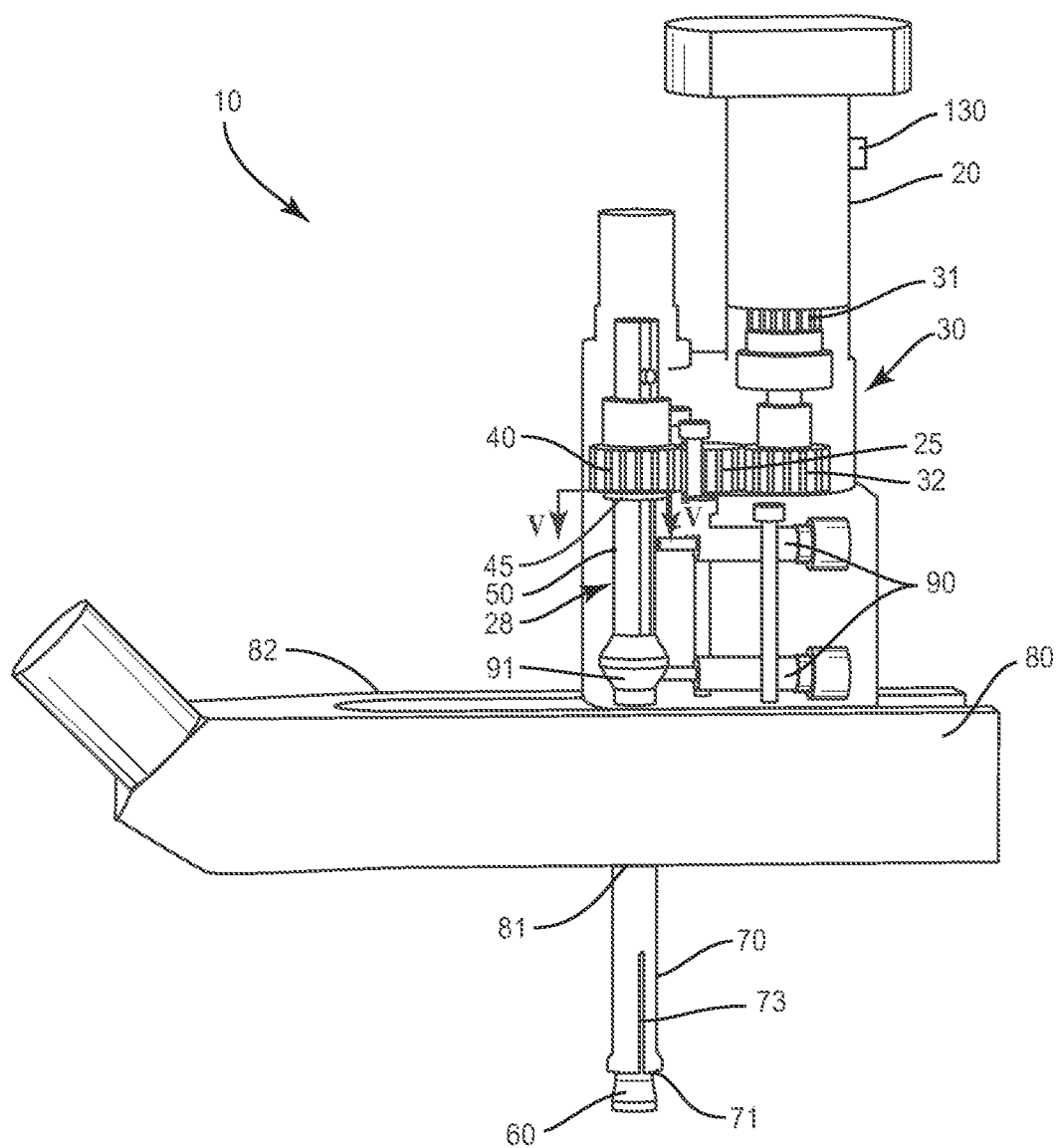
FIG. 2 is a side view of a fixturing device with an exterior housing of the device removed for viewing an interior of the device.

FIG. 2 illustrates the device 10 with the exterior housing 11 removed for viewing of the internal components. The main body 15 of the device 10 includes a motor 20, a gear set that includes gears 30, and an elongated member 28. The motor 20 is configured to operate in both forward and reverse directions. Various types of motors 20 may be used in the device 10, including a pneumatic motor and an electric motor. The embodiment of FIG. 2 includes a reversible pneumatic motor 20 with a forward port to receive pressurized air to rotate in a first direction and a reverse port to drive the motor 20 in an opposing second direction. Motor 20 further includes an activation switch 130 (e.g., a trigger) for activation and deactivation.

The gear set 30 transfers the rotation movement supplied by the motor 20 to the elongated member 28. The gear set 30 may include a reduction gear set 31, such as a planetary reduction gear set that increases the output torque supplied by the motor 20 and reduces the output speed of the rotational motion. The gear set may also include a drive gear 32 that is driven by the reduction gear set 31. In one or more embodiments, the reduction gear set 31 and the drive gear 32 are axially aligned in a vertical configuration that extend vertically below the motor 20 as illustrated in FIG. 2. The drive gear 32 engages with and drives an idler gear 25 which in turn is engaged with and drives a feed gear 40. Each of the drive gear 32, idler gear 25, and feed gear 40 include gear teeth about their peripheries that engage together. In another embodiment, the drive gear 32 directly engages with and drives the feed gear 40. The drive gear 32 may also be engaged with the feed gear 40 through a pulley that extends around the gears.

Figure 3:
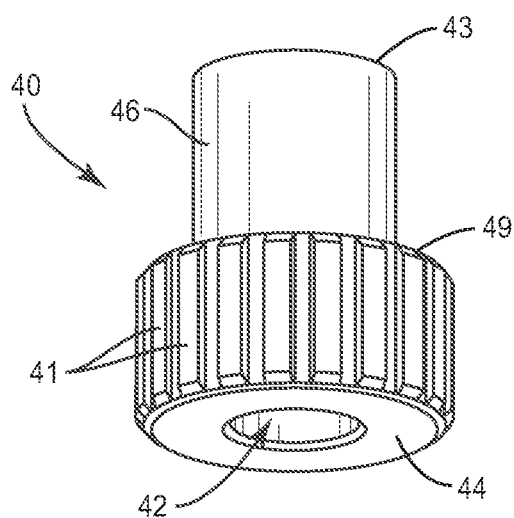
FIG. 3 is a perspective view of a feed gear.

FIG. 3 illustrates a feed gear 40. The feed gear 40 includes exterior gear teeth 41 configured to engage with corresponding teeth on the idler gear 25. An opening 42 extends inward from a first end 44 of the gear 40. The opening 42 may extend through the entirety of the length of the gear 40, or may extend a limited distance into the interior from the first end 44. The opening 42 is centered within the gear 40 and includes an internal screw thread. A bearing surface 43 extends along the exterior of the gear 40 between the gear teeth 41 and a second end. The feed gear 40 may be constructed as a single, unitary member as illustrated in FIG. 3. Alternatively, the feed gear 40 may be constructed from separate elements that are attached together. In one embodiment, the drive gear 40 includes a separate gear section 49 that includes the gear teeth 41 and a separate neck section 46. The neck and gears sections 46, 49 are rotatably connected together.

In one embodiment as illustrated in FIG. 2, the gear 40 is fixed in position within the body 15. This positioning may include the first end 44 of the feed gear 40 being in contact with a platform 45. The fixed position causes rotation of the gear 40 to axially move the screw 50 in first (i.e., forward) and second (i.e., reverse) axial directions relative to the gear 40 depending upon the rotational direction of the gear 40. This movement may be along an axis that is perpendicular to the base 80. This movement may also be perpendicular to the work piece 100 when the device 10 is positioned on the work piece 100.

The elongated member 28 is operatively connected to the gear set. The connection provides for the rotation of the gear set to provide axial movement of the elongated member 28. The elongated member 28 includes a straight shape with opposing first and second ends. A portion or entirety of a length of the member 28 is threaded to engage with the feed gear 40. The member 28 further includes an enlarged section in proximity to the first end that engages with the collet 70 as will be explained in detail below. The elongated member 28 may be constructed as a single unitary piece, or may be constructed from two or more separate sections that are connected together. FIG. 2 includes the elongated member 28 including an upper mechanical screw 50 and a lower mandrel 60 that are connected together in an end-to-end orientation.

Figure 4:
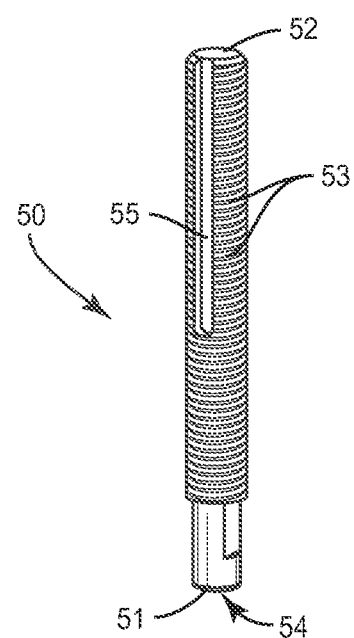
FIG. 4 is a perspective view of a mechanical screw.
Figure 5:
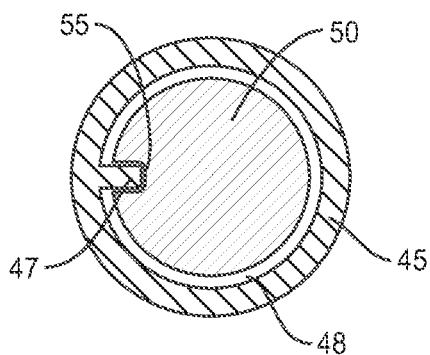
FIG. 5 is a sectional view cut along line V-V of FIG. 2 illustrating a protrusion positioned within a slot in the mechanical screw.

The mechanical screw 50 engages with the opening 42 in the gear 40. As illustrated in FIG. 4, the mechanical screw 50 includes an elongated shape with a first end 51 and a second end 52. The exterior of the screw 50 includes a thread 53 that engages with the threaded opening 42 in the feed gear 40. The threads 53 may extend along an entirety of the length of the screw 50, or along a limited section. A slot 55 extends axially along the screw 50. The slot 55 may extend the entire length, or a limited section of the length. The slot 55 receives a protrusion 47 that prevents the screw 50 from rotating while being driven in upward and downward directions by the rotating feed gear 40. In one embodiment as illustrated in FIGS. 2 and 5, the platform 45 on which the feed gear 40 is positioned includes a protrusion 47 that extends outward into an opening 48 through which the screw 50 extends. Thus during rotation of the feed gear 40, the screw 50 is prevented from rotating due to the positioning of the protrusion 47 within the slot 55. The protrusion 47 may also be positioned at other structures adjacent to the screw 50. In one embodiment, the feed gear 40 is constructed from two separate components that include a gear section 49 and a neck section 46. The sections 46, 49 are connected together such that the gear section 49 can rotate relative to the neck section 46. The protrusion 47 extends outward from a sidewall of the opening 42 that extends in the neck section 46. The mechanical screw 50 may include a single slot 55 that receives a single protrusion 47, or may include two or more slots 55 that each receives a protrusion 47.

The device 10 is configured to control an extent of axial movement of the screw 50 along the movement axis in the first and second directions. As illustrated in FIG. 2, one or more sensors 90 are positioned in proximity to the screw 50. The sensors 90 are configured to detect a marker on the screw 50. In one embodiment, this includes detecting a marker 91 that is attached to and moves with the screw 50. The marker 91 may be attached to the screw 50 in a variety of manners including but not limited to being directly threaded onto the screw, retained in position with a separate set screw, and secured by an adhesive. The position sensors 90 are configured to detect the stop nut 91 at one or more predetermined positions along the movement axis and provide a signal resulting in a change in motor operation. The marker may further include a marking such as a coating applied to the exterior of the screw 50 or a notch within the screw 50.

Various types of sensors 90 may be used to determine the position of the screw 50. One example is a contact type cartridge air valve that blocks an air signal when a stem is depressed due to contact with the stop nut 91. Similar types of mechanically triggered air valves can be used as well as non-contact air switches. Non-contact air switches are triggered by the pressure change introduced when an object is positioned near the sensing port. Electronic proxy sensors such as Reed switches that are more suitable to electric motor configurations can also be used. One or more embodiments may include a linear scale system, motor encoder, optical switches, contact switches, and Hall Effect switches.

Figure 6:
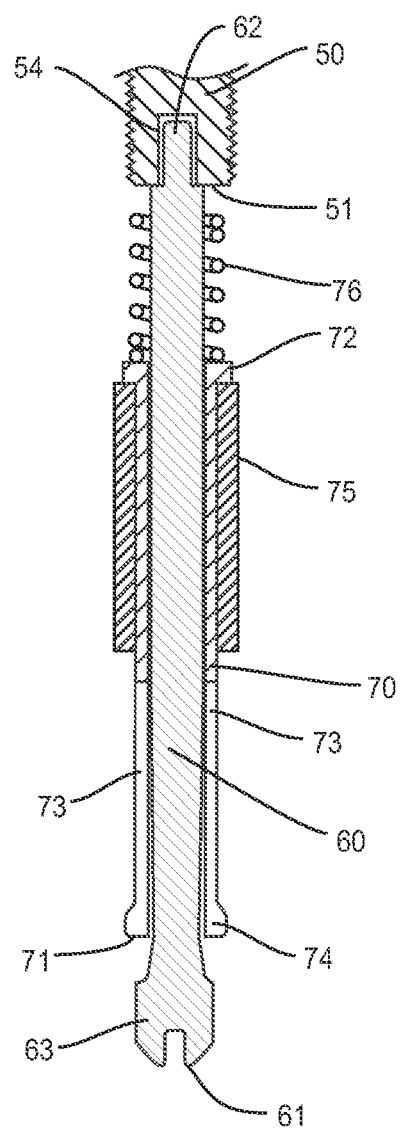
FIG. 6 is a sectional view of a mandrel attached to an end of a mechanical screw and positioned within an interior space of a collet and including a sleeve that receives the collet.

The first end 51 of the screw 50 is further configured to engage with the mandrel 60. In one embodiment as illustrated in FIG. 6, the first end 51 includes an inwardly-extending opening 54 that receives the mandrel 60. The mandrel 60 in turn is positioned within an interior of a collet 70.

Each of the mandrel 60 and the collet 70 include elongated, straight shapes with the mandrel 60 extending within an interior of the collet 70. The mandrel 60 includes a first end 61 and a second end 62. The second end 62 is mounted in the opening 54 in the screw 50. In one embodiment, the second end 62 is threaded to engage with the threaded opening 54 at the first end 51 of the screw 50. An enlarged head 63 is positioned at or near the first end 61. The head 63 includes a greater width than a remainder of the mandrel 60, and also a greater width of the interior width of the collet 70 when positioned beyond the end of the collet 70.

The collet 70 includes an elongated shape with a first end 71 and opposing second end 72. An enlarged flange 74 at the first end 71 is wider than a remaining portion of the collet 70. One or more axial slits 73 extend inward from the first end 71. The slits 73 provide for expanding and contracting the cross-sectional width during movement of the head 63 of the mandrel 60 within the interior space.

The collet 70 is mounted within a sleeve 75 that is attached to one or more the body 15 or base 80 of the device 10. The collet 70 is axially movable in downward and upward directions along the movement axis of the mandrel 60 within the sleeve 75. A biasing member 76 may be positioned between the second end 72 of the collet 70 and the first end 51 of the screw 50 to bias the collet 70 in a downward direction. When the mandrel 60 is pulled into the collet 70, the upward movement of the mandrel 60 causes the collet 70 to move upward within the sleeve 75. This provides for a clamping force to be applied to the work piece 100.

As illustrated in FIG. 2, the device 10 further includes a base 80 to accommodate the force applied to the mandrel 60 as will be explained in detail below. The work piece 100 is clamped against the base 80 due to the force being applied through the collet 70. The base 80 stabilizes the device 10. The base 80 may also include a flat, smooth surface for moving along the work piece 100. The base 80 includes an opening 81 through which the mandrel 60 and collet 70 extend. The base 80 also includes a mount 82 to receive a tool (not illustrated in FIG. 2). In one embodiment, the sleeve 75 that extends around the collet 70 is mounted within the opening 81.

Figure 7:
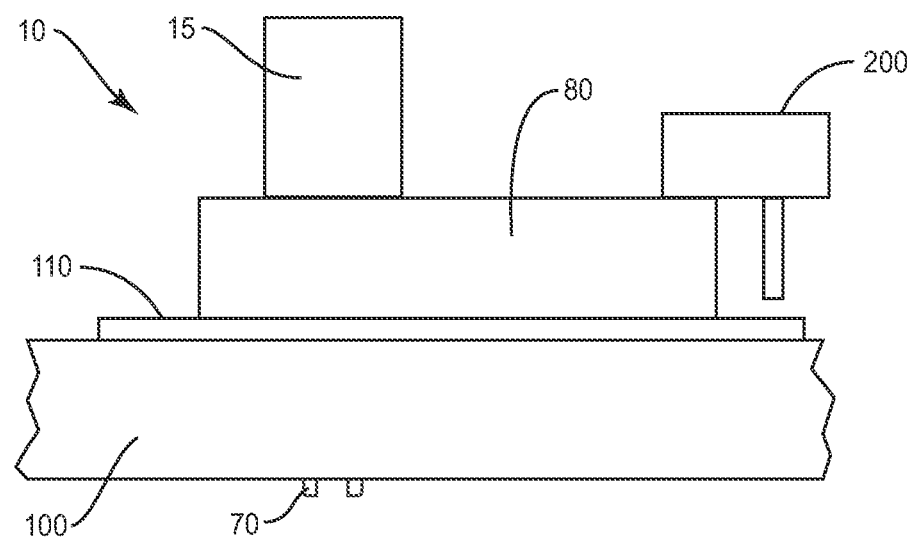
FIG. 7 is a schematic view of a device with an attached tool that is mounted to a work piece.

In use, a tool 200 is attached to the device 10 as illustrated in FIG. 7. To facilitate positioning relative to the work piece 100, a template 110 may be attached to a surface of the work piece 100. The template 110 includes openings for aligning the extension 13 and the tool 200. In one or more embodiments, the base 80 is positioned in contact with the top surface of the work piece 100 and/or template 120.

The device 10 is aligned with an opening 110 in the work piece 100 and the mandrel 60 and collet 70 are inserted into the opening 110. Prior to insertion, the mandrel 60 is positioned with the enlarged head 63 extending outward beyond the first end 71 of the collet 70. This causes the collet 70 to retract to a reduced size.

Once positioned, the motor 20 is activated. In one embodiment with a pneumatic motor 20, pressurized air is supplied to a forward port of the motor 20. Motor rotation is transferred to the reduction gear set 31 that increases the output torque and reduces the output speed of the rotational motion. The rotational motion from the reduction gear set 31 is transferred to the drive gear 32, the idler gear 25, and then the feed gear 40.

The feed gear 40 includes a threaded opening that engages with the external thread on the mechanical screw 50. The slot 55 on the mechanical screw 50 is engaged with a protrusion 47 to prevent the screw 50 from rotating. Thus, the rotational motion from the feed gear 40 is converted to upward linear motion in the mechanical screw 50. The mandrel 60 that is mechanically attached to the screw 50 likewise moves upward. The upward motion of the mandrel 60 causes the enlarged head 63 to move into the interior of the collet 70 and expand the size of the collet 70. The head 63 moving within the interior of the collet 70 causes the collet 70 to expand in size and for the flange 74 at the first end to enlarge in size to be greater than the opening 110. With the enlarged flange 74 positioned outward from the opening 110, the upward motion of the mandrel 60 also moves the collet 70 upwards within the sleeve 75. Thus the flange 74 contacts against the back side of the work piece 100 and pulls the work piece 100 against the base 80.

The extent of movement of the mandrel 60 within the collet 70 is controlled by the one or more of the sensors 90. In one embodiment, an upper sensor 90 detects the marker 91 on the screw 50 once it reaches a predetermined upward position. This causes the sensor 90 to send a signal to the motor 20. The signal may result in various outcomes, such as changing the motor speed, output torque, or the direction of motor rotation. Once the device 10 is clamped due to the contact of the flange 74 against the back side of the work piece 100, the force generated is independent of the air pressure resulting in consistent clamping during the tool operation.

The amount of clamping force to secure the device 10 to the work piece 100 may vary. In one embodiment, the securing force is at least 500 lbs.

Once the device 10 is secured to the work piece 100, the attached tool 200 is activated to perform the operation on the work piece 100. Once complete, the tool 200 is deactivated.

Once the tool operation is complete, the gear set 30 is driven in a reverse direction. This may occur by reversing the direction of the motor 20 or through use of a gearbox. For a pneumatic motor 20, this includes supplying pressurized air to a reverse port thus causing the motor 20 to rotate in a reverse direction. This rotational motion from the motor 20 is transferred to the reduction gear set 31, the drive gear 32, the idler gear 25, and the feed gear 40. The rotation of the feed gear 40 in this opposite direction causes the mechanical screw 50 and attached mandrel 60 to move downward within the body 15. This movement also causes the collet 70 to move downward within the sleeve 75 and for the head 63 to move outward beyond the first end 71 of the collet 70. This movement beyond the collet 70 causes the collet 70 to shrink in size. The device 10 may then be removed from the opening 110 in the work piece 100 and moved to another location as necessary.

The extent of movement of the screw 50 in the downward direction is controlled by a position sensor 90. In one embodiment, the lower sensor 90 detects the marker 91 that is attached to an exterior of the screw 50 when it reaches a predetermined lower position. The position sensor 90 sends a signal resulting in a change in operation of the motor 20.

Figure 8:
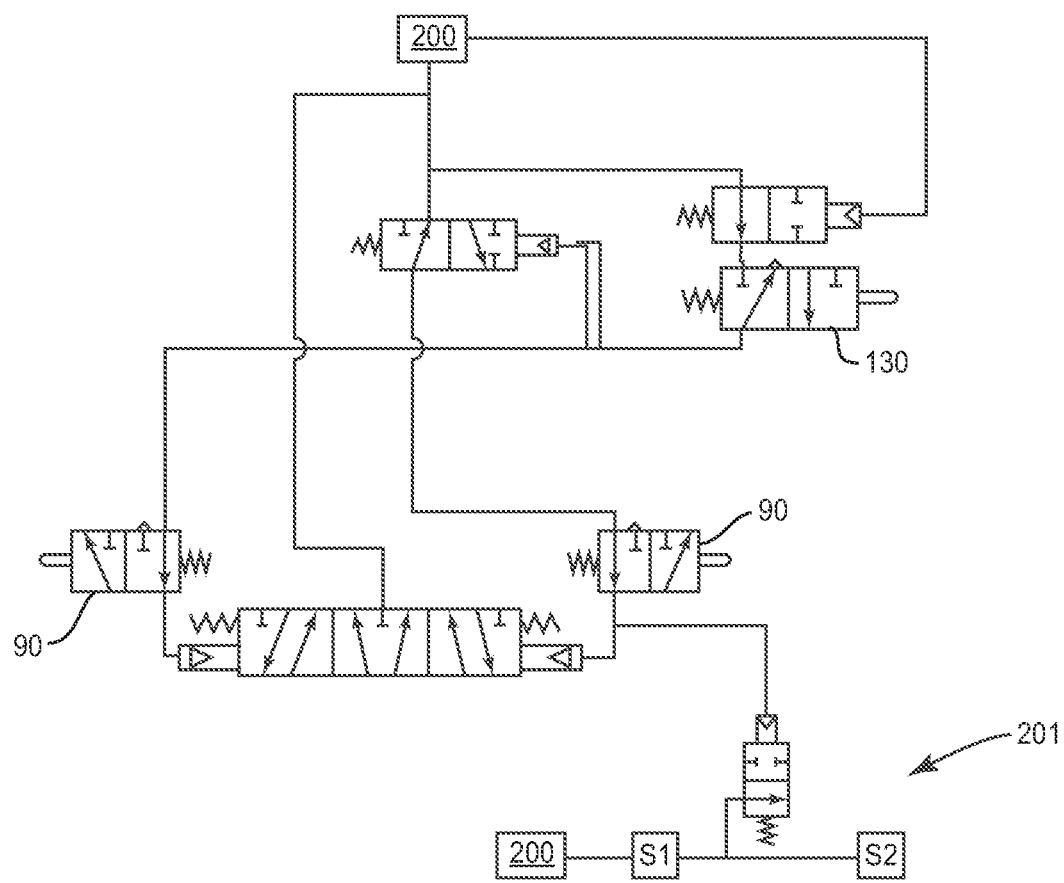
FIG. 8 is a schematic diagram of an air control system for a pneumatically controlled device.

The motor 20 may include an air logic system that controls one or more functions of the device 10. FIG. 8 illustrates on embodiment of a system for a pneumatic-powered device 10. An air supply 200 supplies air to operate the motor 20. The trigger 130 on the body 15 may be activated by the user to operate the device 10. While the motor 20 is operating in a first direction, the screw 50 moves in a first direction. Upon reaching a predetermined position, a first position sensor 90 sends a signal indicating the relative position. The signal results in a change in motor operation, such as a change of motor speed, change in output torque, or a change in direction of the motor 20. Likewise, upon reaching an opposing predetermined position, the same or different position sensor 90 signals for a change in motor operation. A failsafe 201 supplies a self-locking feature. The failsafe 201 prevents the operation of the tool to start without proper fixturing of the device 10. When air is being fed to the forward port of the motor 20, a signal is generated to allow the tool operation cycle to start. The operation is prohibited without this signal. In one embodiment, the failsafe 201 includes a sensor that determines whether the device 10 is properly mounted onto the work piece 100.

Figure 9:
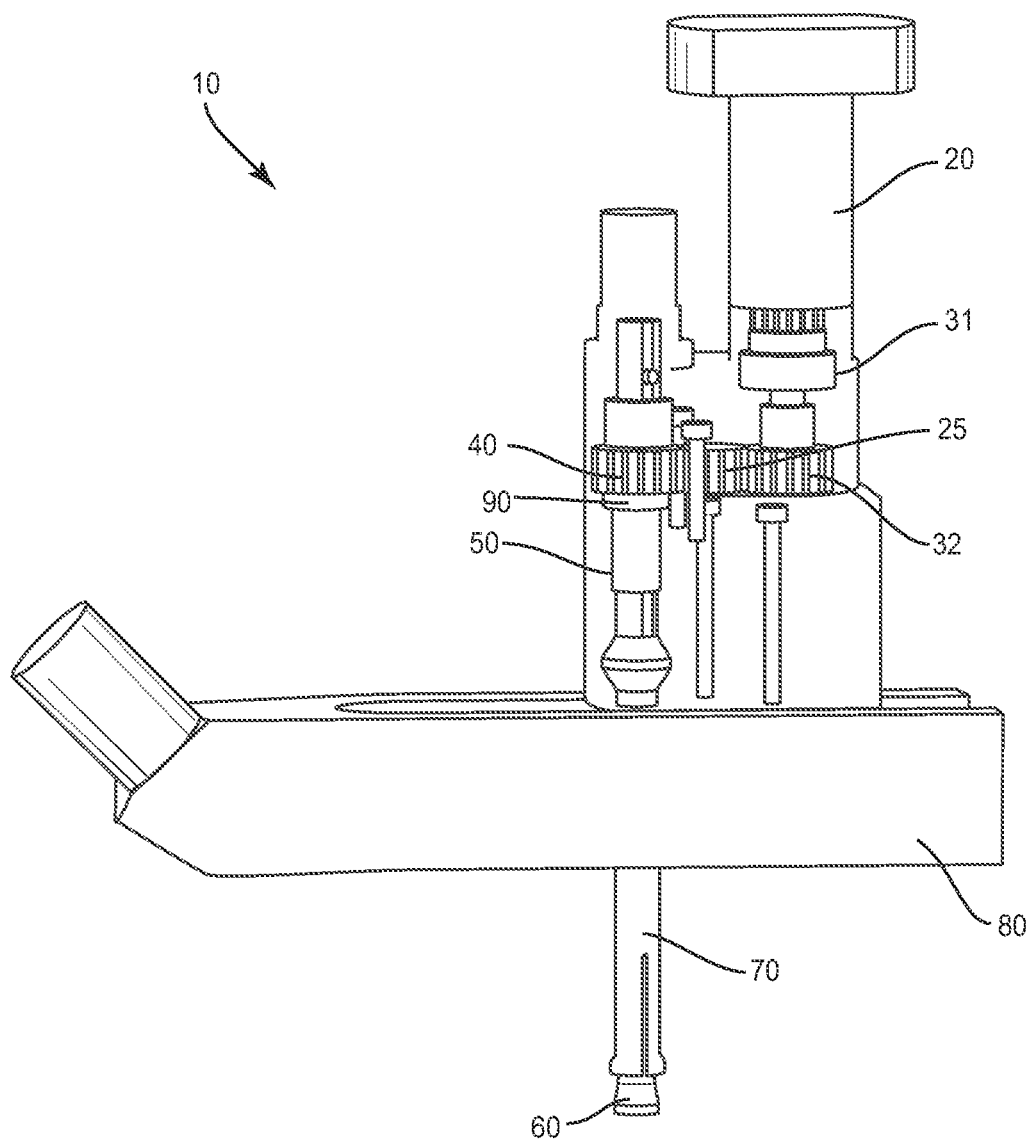
FIG. 9 is a side view of a fixturing device with an exterior housing removed for viewing an interior of the device.

FIG. 9 illustrates another embodiment of a device 10 that includes an electric motor 20. During operation, the motor 20 is signaled to turn in a forward direction. This rotation is transferred to the reduction gear package 31 that increases the output torque and reduces the output speed of the rotational motion. The rotational motion from the reduction gear package 31 is transferred to the drive gear 32, idler gear 25, and then the feed gear 40. The feed gear 40 is internally threaded allowing it to engage the external thread on the mechanical screw 50. As previously described, the screw 50 includes a slot 55 that receives a protrusion 47 to prevent it from rotating thus causing the rotational motion from the feed gear 40 to be converted to upward linear motion in the mechanical screw 50. The mandrel 60 that is mechanically attached to the screw 50 is moved upwards thus causing the collet 70 to expand and move upwards towards the work piece 100 (not illustrated in FIG. 9). The expanded collet 70 with the enlarged flange 74 also pulls the work piece 100 and base 80 together. The upward motion of the mandrel 60 stops at a predetermined position of the mechanical screw 50. Once completed, a signal is sent to the motor 20 to turn in the reverse direction. This rotation is transferred through the reduction gear set 31, the drive gear 32, the idler gear 25, and the feed gear 40. This in turn moves the mechanical screw 50 downward as well as the attached mandrel 60. This also moves the collet 70 downward and also contracts the size of the enlarged flange 74 of the collet 70 once the head 63 of the mandrel 60 moves beyond the first end 71. The device 10 can then be removed from the work piece 100.

For an electric motor 20, various sensors 90 may be used to track the position along the movement axis of the mechanical screw 50. In one embodiment, a motor encoder 90 tracks the movement and position of the electric motor 20. The movement and the position of the electric motor 20 can be converted into the position of the mechanical screw 50. The encoder 90 can also be used to measure the thickness of the work piece 100. This measurement may be recorded for quality assurance purposes. In another embodiment, a load cell 90 measures a clamp load generated by the device 10. Feedback from the load cell 90 is used to the output torque or speed of the electric motor 20. In another embodiment, one or more position sensors 90 as described above track the position of the screw 50 and signal the motor 20. The various sensing components may be used alone or in combination to determine the position of the screw 50.

Figure 10:
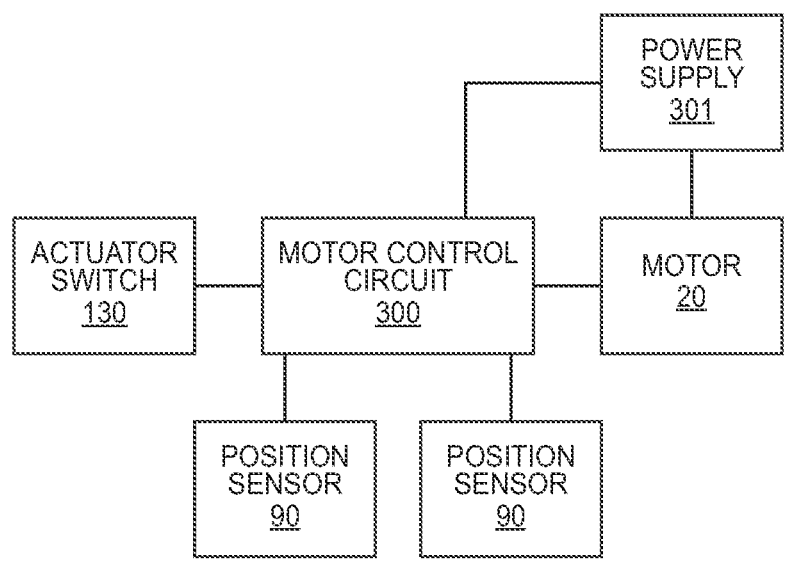
FIG. 10 is a schematic diagram of a motor control system for an electrically-controlled device.

FIG. 10 illustrates components of the operational control of the device 10. A motor control circuit 300 controls the operation of the motor 20. A power supply 301 supplies power to one or more of the components of the device 10. The one or more position sensors 90 signal the motor control circuit 300 indicating the position of the elongated member 28 along the movement axis. Motor control circuit 300 then adjusts the operation of the motor 20 accordingly.

Figure 11:
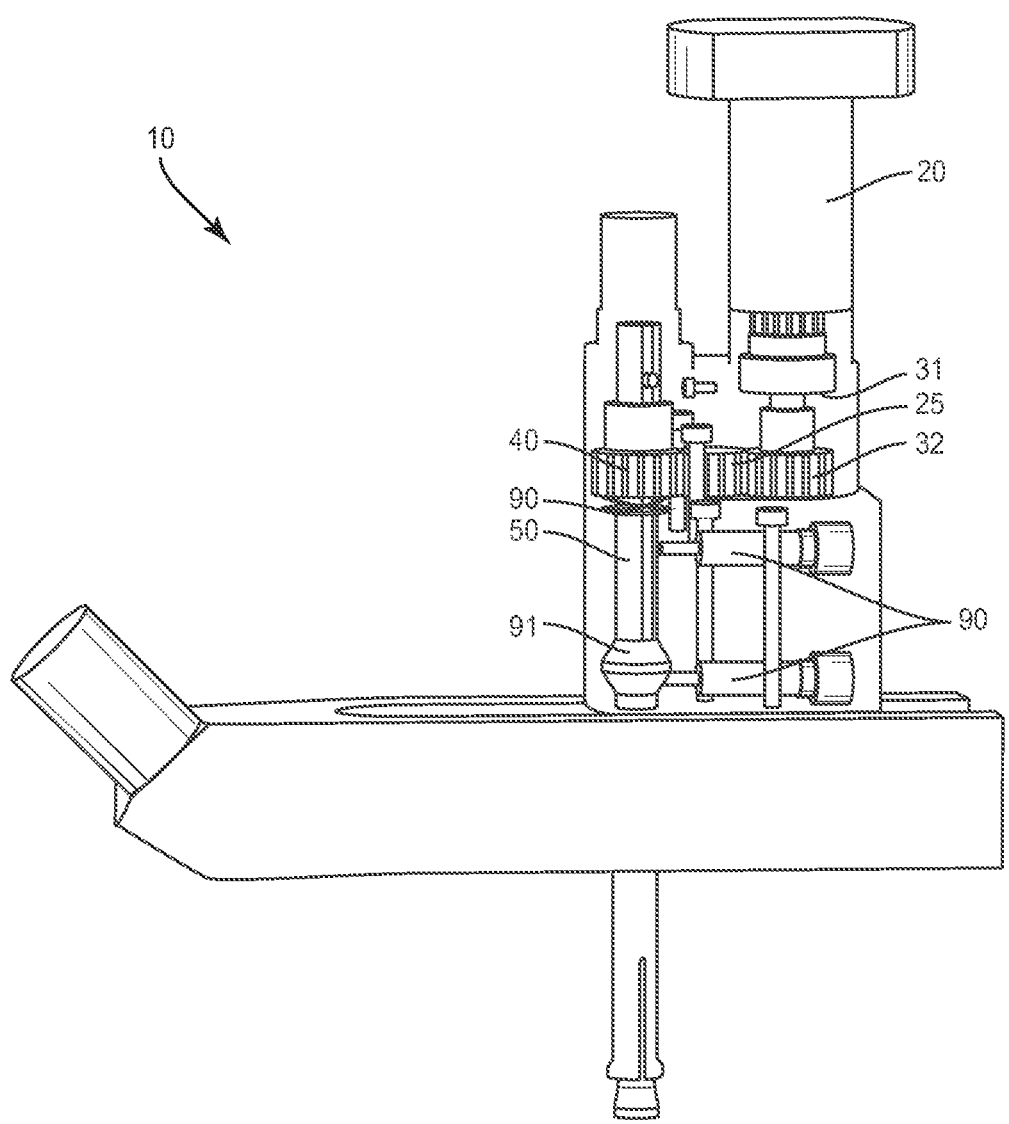
FIG. 11 is a side view of a fixturing device with an exterior housing removed for viewing an interior of the device.

FIG. 11 illustrates another embodiment of a device 10. Although FIG. 11 includes a pneumatic motor 20, this concept is also applicable for an electric motor 20. In this embodiment, one or more spring washers 90 are placed under the feed gear 40. This allows the feed gear 40 to move downward when the device 10 starts to apply clamping force on the work piece 100. The downward movement of the feed gear 40 can be measured by the position sensor 90. The position sensor 90 can send a signal to the motor control to control the operation of the motor 20. In one embodiment, the motor control adjusts the output torque of the motor 20. Controlling the output torque is an indirect way to control the clamp force generated by the device 10. The amount of clamp load generated can be tuned by selecting springs 90 with different stiffness and the position of the position sensor 90. In one embodiment, the position sensor 90 is a non-contact pneumatic proxy switch.

In a pneumatic device 10, the device 10 may be equipped to prevent movement of the elongated member during disruption of air supply. The screw 50 includes a screw pitch (helix) angle. The friction generated between the screw 50 and the feed gear 40 is sufficient to prevent any movement even when air supply is disrupted.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A fixturing device to position a tool relative to a work piece, the fixturing device comprising:
   a motor;
   a gear set with at least first and second gears that are driven by the motor, the first gear being positioned in closer proximity to the motor than the second gear;
   a screw that is connected to second gear to move in a first axial direction away from the work piece when the gear set is driven in a first rotational direction by the motor and to move in an opposing second axial direction towards the work piece when the gear set is driven in a second rotational direction by the motor;
   a protrusion positioned within a slot in the screw to prevent the screw from rotating when moving in the first and second axial directions;

a mandrel attached to the screw to move in the first and second axial directions with the screw, the mandrel including an enlarged head;

an expandable collet with a hollow interior that receives the mandrel and an enlarged flange, the mandrel being axially movable within the hollow interior and including a first width at the enlarged flange when the enlarged head is positioned outward beyond a distal end of the collet and a larger second width at the enlarged flange when the enlarged head is position within the hollow interior;

at least one position sensor to determine an axial position of the screw; and an enlarged base with a contact surface that is spaced away from the enlarged flange of the collet to contact against the work piece when the collet is in the larger second width.

2. The fixturing device of claim 1, wherein the screw extends within an opening in the second gear with both the opening and the second gear each including threads that engage together to move the screw in the first and second axial directions during rotation of the second gear respectively in the first and second rotational directions.

3. The fixturing device of claim 1, wherein the screw and the second gear are threaded to prevent movement of the screw and the mandrel during a disruption in an air supply.

4. The fixturing device of claim 1, wherein the mandrel is attached to an end of the screw and the mandrel and the screw together include an elongated, straight shape.

5. The fixturing device of claim 1, further comprising an enlarged marker attached to the screw, the marker including a larger width than the screw with the at least one position sensor configured to detect a location of the marker.

6. The fixturing device of claim 1, wherein the mandrel includes a greater length than the collet.

7. The fixturing device of claim 1, wherein the base includes an opening that receives the mandrel and the collet, the enlarged head of the mandrel and the distal end of the collet each positioned on an opposing side of the base from the motor.

8. A fixturing device to position a tool relative to a work piece, the fixturing device comprising:

a body with a motor;

an elongated member that is connected to and driven by the motor, the elongated member being movable relative to the body in upward and downward directions along an axis between a first upward position and a second downward position, the elongated member including a first end and an opposing second end, the elongated member also including an enlarged head positioned in proximity to the first end, the elongated member further including an identifying marker positioned between the first and second ends;

an upper position sensor configured to detect the identifying marker when the elongated member has moved along the axis to a predetermined upward position;

a downward position sensor configured to detect the identifying marker when the elongated member has moved along the axis to a predetermined downward position;

a base including an opening through which the elongated member extends, the base including an enlarged contact surface that is transverse to the elongated member;

a collet that is movably positioned within the opening, the collet including a flanged distal end that faces away from the contact surface, the collet including a hollow interior space that receives the elongated member, the collet being expandable to include a first width at the flanged distal end when the elongated member is at the predetermined downward position with the head positioned outward beyond the distal end of the collet and the flanged distal end at a first distance from the contact surface of the base, and a larger second width at the flanged distal end when the elongated member is at the predetermined upward position with the head positioned within the hollow interior space of the collet and the flanged distal end at a smaller second distance from the contact surface of the base.

9. The fixturing device of claim 8, wherein the elongated member includes a threaded screw and a mandrel attached to an end of the threaded screw.

10. The fixturing device of claim 8, wherein the collet includes one or more slits that extend inward from the distal end, each of the slits including opposing sides that are positioned a greater distance apart when the head of the elongated member is positioned within the interior space of the collet than when the head is positions outward beyond the distal end.

11. The fixturing device of claim 8, wherein the identifying marker comprises a nut that is attached onto the elongated member and positioned between the first and second ends.

12. The fixturing device of claim 8, further comprising a gear set that is driven by the motor in first rotational directions and in opposing second rotational directions, the gear set being connected to the elongated member to drive the elongated member.

13. The fixturing device of claim 12, wherein the gear set includes a feed gear that is threaded on the elongated member with the elongated member extending through an opening in the feed gear.

14. A method of attaching a fixturing device to a work piece, the method comprising:

positioning a base on a first side of the work piece and inserting a collet that extends outward from the base through an opening in the work piece with a distal end of the collet being outward beyond a second side of the work piece;

operating a motor and linearly moving an elongated member that is connected to the motor in a first direction, the elongated member extending within the collet;

moving an enlarged head of the elongated member into an interior of the collet and expanding a size of the collet such that a flange on the exterior of the collet is larger than the opening in the work piece;

moving the collet with the elongated member in the first direction and contacting the flange against the second side of the work piece and clamping the work piece against the base;

thereafter, operating the motor and linearly moving the elongated member in an opposing second direction;

moving the enlarged head of the elongated member out of the interior of the collet and reducing the size of the collet; and moving the collet through the opening in the work piece and removing the device from the work piece while the collet is in the reduced size.

15. The method of claim 14, wherein positioning the base on the first side of the work piece comprises contacting the base against the first side of the work piece.

16. The method of claim 14, further comprising operating the motor in a first direction and rotating a feed gear operatively connected to the elongated member and moving the elongated member in the first direction and operating the motor in a second direction and rotating the feed gear and moving the elongated member in the second direction.

17. The method of claim 14, further comprising linearly moving the elongated member in the first and second directions without rotating the elongated member.

18. The method of claim 14, further comprising stopping the movement of the elongated member in the first direction upon sensing that the elongated member has moved to a first predetermined position.

19. The method of claim 14, further comprising moving the elongated member through an opening in a feed gear.

20. The method of claim 14, further comprising receiving a signal from a position sensor when the elongated member moves to a first predetermined position and stopping the movement of the elongated member in the first direction.

\* \* \* \* \*